(12) United States Patent
Hillier, III et al.

(10) Patent No.: US 7,908,443 B2
(45) Date of Patent: *Mar. 15, 2011

(54) MEMORY CONTROLLER AND METHOD FOR OPTIMIZED READ/MODIFY/WRITE PERFORMANCE

(75) Inventors: Philip Rogers Hillier, III, Rochester, MN (US); William Paul Hovis, Rochester, MN (US); Joseph Allen Kirscht, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 12/136,750

(22) Filed: Jun. 10, 2008

(65) Prior Publication Data
US 2009/0024807 A1    Jan. 22, 2009

Related U.S. Application Data

(63) Continuation of application No. 11/779,277, filed on Jul. 18, 2007, now Pat. No. 7,475,202, which is a continuation of application No. 10/970,400, filed on Oct. 21, 2004, now Pat. No. 7,328,317.

(51) Int. Cl.
*G06F 12/00* (2006.01)

(52) U.S. Cl. .................. 711/155; 711/170; 714/702

(58) Field of Classification Search ............. 711/155
See application file for complete search history.

(56) References Cited

U.S. PATENT DOCUMENTS

| 5,987,628 | A  | * | 11/1999 | Von Bokern et al. ........... 714/48 |
| 6,490,462 | B2 |   | 12/2002 | Ozulturk et al. |
| 6,490,642 | B1 |   | 12/2002 | Thekkath et al. |
| 6,718,444 | B1 | * | 4/2004  | Hughes ...................... 711/155 |
| 6,973,551 | B1 |   | 12/2005 | Walton |

* cited by examiner

*Primary Examiner* — Kevin L Ellis
*Assistant Examiner* — Matthew Bradley
(74) *Attorney, Agent, or Firm* — Martin & Associates, LLC; Bret J. Petersen

(57) ABSTRACT

A memory controller optimizes execution of a read/modify/write command by breaking the RMW command into separate and unique read and write commands that do not need to be executed together, but just need to be executed in the proper sequence. The most preferred embodiments use a separate RMW queue in the controller in conjunction with the read queue and write queue. In other embodiments, the controller places the read and write portions of the RMW into the read and write queue, but where the write queue has a dependency indicator associated with the RMW write command in the write queue to insure the controller maintains the proper execution sequence. The embodiments allow the memory controller to translate RMW commands into read and write commands with the proper sequence of execution to preserve data coherency.

13 Claims, 8 Drawing Sheets

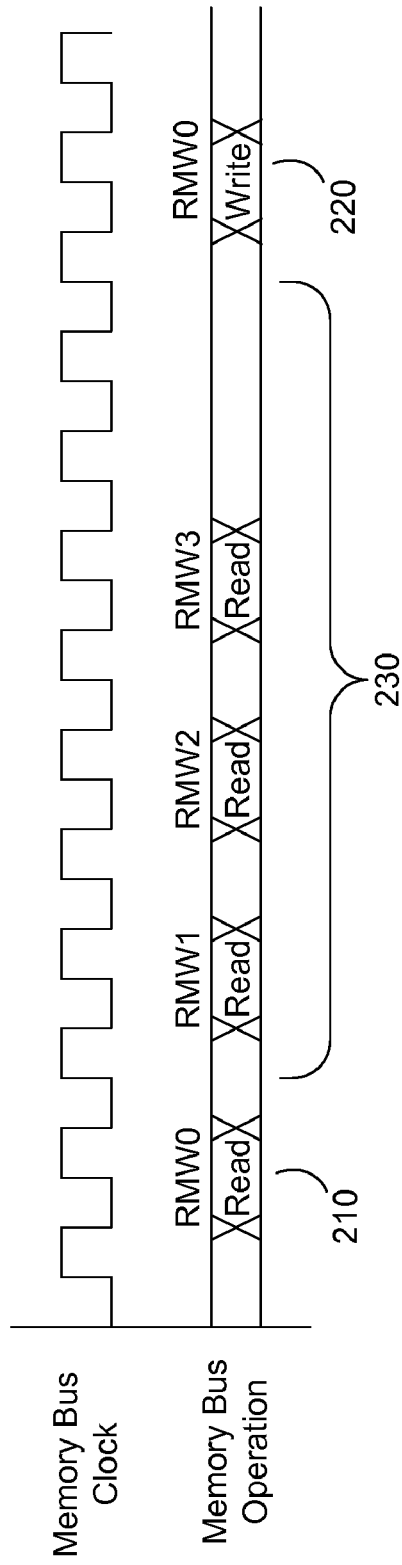
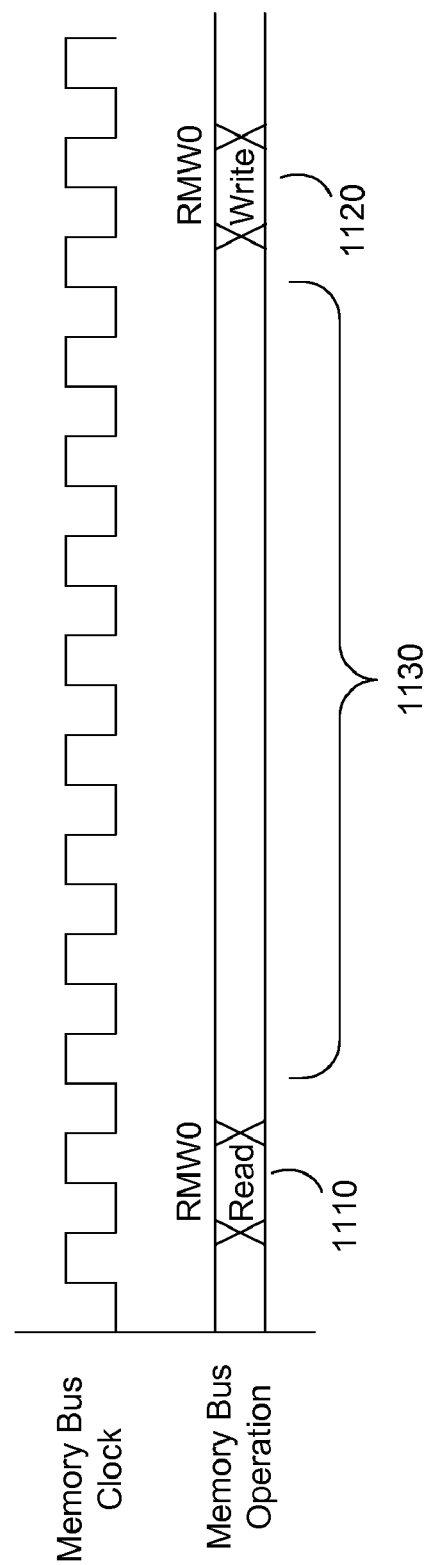

MEMORY CONTROLLER AND METHOD FOR OPTIMIZED READ/MODIFY/WRITE PERFORMANCE

CROSS-REFERENCE TO PARENT APPLICATIONS

This patent application is a continuation of Ser. No. 11/779,277 filed on Jul. 18, 2007, now U.S. Pat. No. 7,475,202, which is a continuation of Ser. No. 10/970,400, filed on Oct. 21, 2004, now U.S. Pat. No. 7,328,317. Both of these parent applications are incorporated herein by reference.

BACKGROUND OF THE INVENTION

1. Technical Field

This invention generally relates to computer memory systems, and more specifically relates to optimizing read/modify/write control in a computer memory system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). One key component in any computer system is memory.

Modern computer systems typically include dynamic random-access memory (DRAM). DRAM is different than static RAM in that its contents must be continually refreshed to avoid losing data. A static RAM, in contrast, maintains its contents as long as power is present without the need to refresh the memory. This maintenance of memory in a static RAM comes at the expense of additional transistors for each memory cell that are not required in a DRAM cell. For this reason, DRAMs typically have densities significantly greater than static RAMs, thereby providing a much greater amount of memory at a lower cost than is possible using static RAM.

However, DRAMs are also more prone to errors in the data read from the memory. Sophisticated error correction circuitry has been developed that allow detecting errors in a DRAM. During a typical read cycle, a cache line is read, causing a corresponding read of an error correction code (ECC) from memory. The error correction circuitry uses the ECC to detect if there are errors in the data within the ECC boundary. The ECC boundary is the amount of data or size of the chunk of memory used to generated the ECC (such as a cache line). When data is written to memory the error correction circuitry generates the ECC, which is then written to the cacheline with the data, and then into the memory.

Modern DRAM memory controllers support a memory command known as Read/Modify/Write (RMW). A RMW command is used to write less data than a full cache line. Before the write operation, the full cache line of data must be read to be combined with the new data of the RMW command. This is necessary to assure data integrity in the memory and so that a new error correction code can be generated for the store. In the prior art, once the RMW cycle starts, the entire RMW sequence is performed as an atomic operation to assure data integrity. If processor reads occur just after the read operation of the RMW cycle, the processor reads have to wait until the atomic RMW operation is completed. As a result, prior art memory controllers negatively affect system performance when performing Read/Modify/Write operations due to excessive time spent processing RMW operations. Without a way for performing Read/Modify/Write operations in a way that does not make processor read cycles wait, the computer industry will continue to be plagued with decreased performance during Read/Modify/Write cycles.

DISCLOSURE OF INVENTION

A memory controller optimizes execution of read/modify/write (RMW) commands by breaking the RMW commands into separate and unique read and write commands that do not need to be executed together, but just in the proper sequence. Some embodiments use a separate RMW queue in the controller in conjunction with the read queue and write queue. In other embodiments, the controller places the read and write portions of the RMW into the read and write queue, but where the write queue has a dependency indicator associated with the RMW write command in the write queue to insure the controller maintains the proper execution sequence. The embodiments allow the memory controller to translate RMW commands into read and write commands with the proper sequence of execution to preserve data coherency.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 2 is a sample timing diagram showing the function of the memory controller of FIG. 1;

FIG. 11 is a sample timing diagram showing the function of the prior art memory controller of FIG. 10.

BEST MODE FOR CARRYING OUT THE INVENTION

A prior art memory controller and method are first presented herein to provide a context for the discussion of the preferred embodiments.

Figure 10:
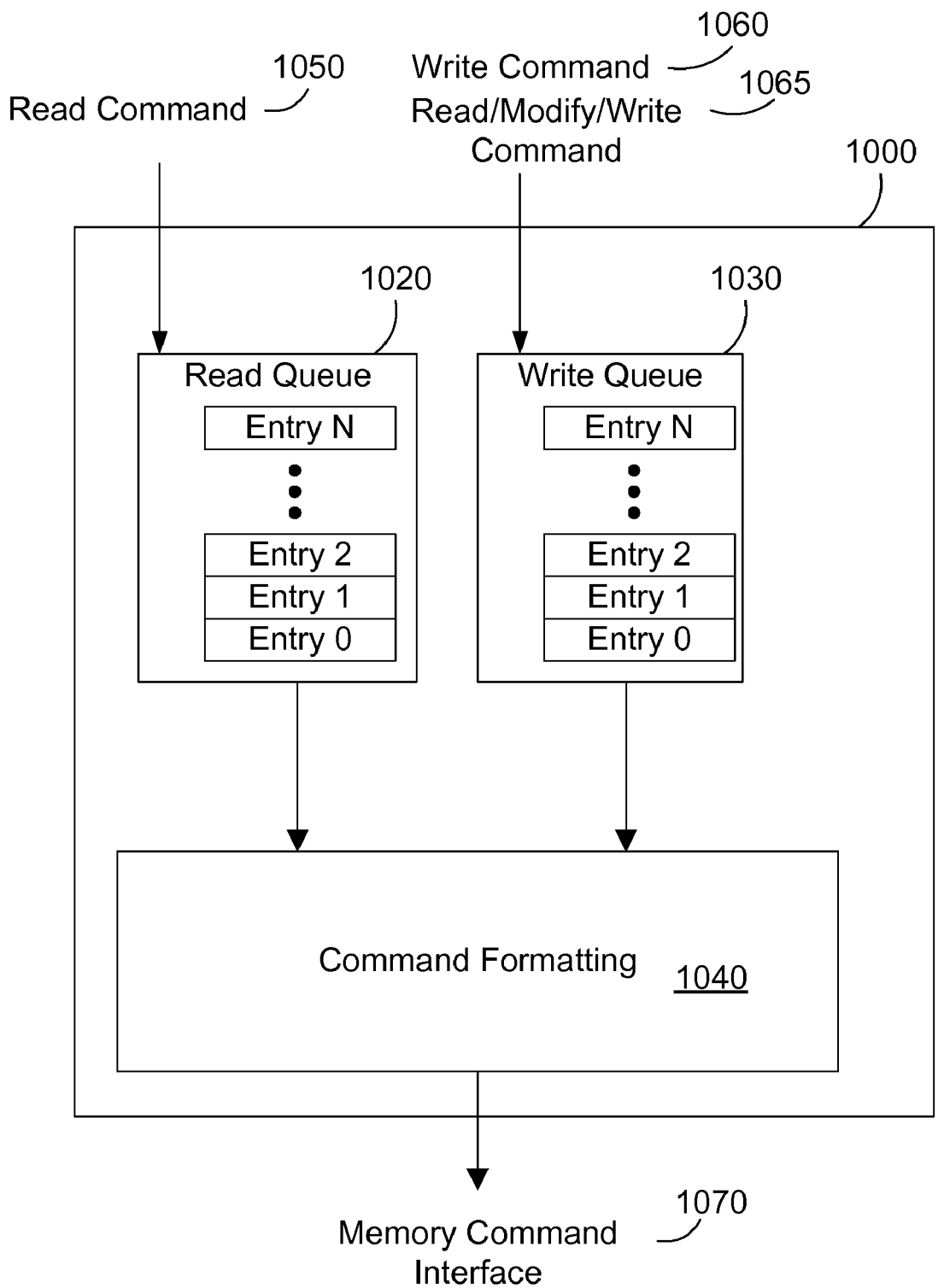
FIG. 10 is a block diagram of a prior art memory controller.

Referring to FIG. 10, a memory controller 1000 in accordance with the prior art includes a read queue 1020, a write queue 1030, and command formatting logic 1040. A read command 1050 from a processor may be written to the read queue 1020. The read queue 1020 includes a plurality of entries that are processed by the memory controller 1000. A write command 1060 from the processor may be written to the write queue 1030. The write queue 1030 includes a plurality of entries that are processed by the memory controller 1000. RMW commands 1065 from the processor are also written to the write queue 1030. In the memory controller 1000 read operations may have priority over write operations. RMW commands 1065 are serviced by processing the read portion of the command from the write queue and then holding the write portion of the command until the read is completed. The command formatting logic 1040 presents appropriate commands to the memory via the memory command interface 1070.

The "read/modify/write" (RMW) operation presents unique problems to the memory controller 1000. The RMW operation is so designated due to its atomic operation. Atomic operation means that once the RMW operation is commenced, all other accesses to the memory are delayed until the RMW operation is complete. The RMW operation is used for systems having error correction or systems without error correction that don't have partial write capability. In some systems the RMWs are simply stores that are less than a full cacheline in size, so the full cache line of data must be read before being combined with the RMW data and then written back into memory. By delaying processor accesses that occur during the atomic RMW cycle, each subsequent processor access suffers the delay time that resulted from waiting for the RMW cycle to complete. The result is a decrease in system performance caused by this delay.

The delay in prior art RMW cycles is illustrated by a simplified timing diagram shown in FIG. 11. The activity on the memory controller 1000 is shown under the heading "Memory Bus Operation" compared with the timing of a "Memory Bus Clock." A first RMW cycle is designated as RMW0. The RMW0 cycle has a read command 1110 and a write command 1120. The time between the read command 1110 and a write command 1120 is a RMW time delay 1130. In the prior art memory controllers, the time delay 1130 was unproductive, since the memory controller 100 had to delay other memory access commands until the RMW command was completed. This time delay 1130 can significantly reduce memory bandwidth in a data stream that contains a large number of RMW commands.

Figure 1:
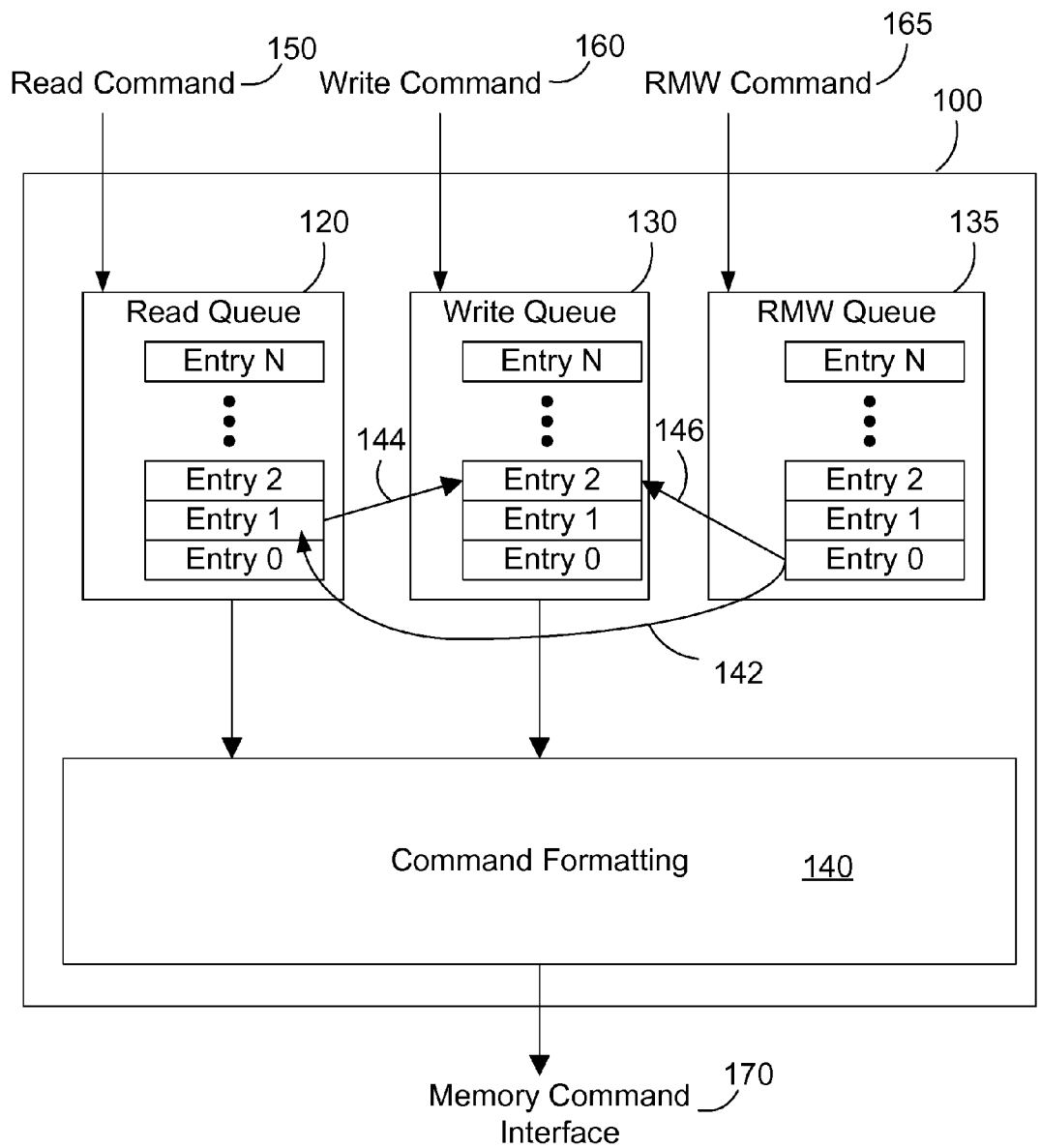
FIG. 1 is a block diagram of a memory controller in accordance with the preferred embodiments.

The preferred embodiments translate the formerly atomic read/modify/write operation into separate read and write operations using an architecture and protocol that assures that processor read cycles are not delayed while the RMW cycles are in progress. Referring to FIG. 1, a memory controller 100 in accordance with the preferred embodiments includes a read queue 120, a write queue 130, a RMW queue 135 and command formatting logic 140. A read command 150 from a processor may be written to the read queue 120. The read queue 120 includes a plurality of entries that are processed by the memory controller 100. A write command 160 from the processor may be written to the write queue 130. The write queue 130 includes a plurality of entries that are processed by the memory controller 100. A RMW command 165 from the processor may be written to the RMW queue 135. The RMW queue 135 includes a plurality of entries that are processed by the memory controller 100.

In the memory controller 100 of the preferred embodiments, read operations may have priority over write operations (similar to the prior art), so the read queue 120 is serviced until all its entries have been processed, at which time one or more entries in the write queue 130 may be processed. Since the memory controller 100 in the preferred embodiments can distinguish a RMW read over a processor read, the memory controller 100 can also give priority to processor reads over RMW reads. RMW commands can be processed sequentially, in groups or upon a certain threshold as described below. The command formatting logic 140 presents appropriate commands to the memory via the memory command interface 170.

The memory controller 100 in FIG. 1 processes incoming commands from the processor by identifying the type of command (read, write or RMW) and placing them in the appropriate queue. The memory controller 100 then executes the commands in the queues. The read queue 120 may be given priority. Commands on the read queue 120 and the write queue 130 are executed from the respective queue in a manner known in the prior art except where described differently herein. Execution of commands on the RMW queue are accomplished by translating them and placing them on the read and write queues as described below. This embodiment with a RMW queue takes much of the complexity out of the write queue 130 compared to prior art architectures for handling RMW commands within the write queue. The embodiment also simplifies the complexity of commands to be executed by the memory controller. A RMW queue that does not execute commands directly simplifies the command execution for the memory controller. This includes optimization of command order within the queue and switching between command in the read and write queues.

Commands in the RMW queue 135 are translated into separate read and write operations. The RMW commands are not executed out of the RMW queue 135. The memory controller 100 first writes the read portion of the RMW command in the RMW queue 135 to the read queue 120 as shown by arrow 142 in FIG. 1. The memory controller 100 then waits for data from the read command to be returned from the read portion of the RMW command that was placed on the read queue 120 and executed from the read queue. The portion placed on the read queue 120 is processed and executed from the read queue 120 as is known in the prior art. The memory controller 100 then combines data returned from the read command (represented by arrow 144) with the partial RMW data of the original RMW command (represented by arrow 146) into a single write command and places the write command on the write queue 130. The combining or merging of the data is done in a register or in the data queues (not shown) that are associated with the command queues. The associated data queues are known in the prior art and are not shown for simplicity.

In preferred embodiments, command processing in the RMW queue is deferred to achieve various advantages. Rather than process a single RMW command, the memory controller 100 may defer the processing of the RMW command until meeting certain conditions or until there is a certain number of commands in the queue. The deferring of commands allows for optimization and clustering as described further below. The memory controller 100 may defer based on a low water mark, a high water mark, a full indicator and/or a timer.

The architecture of the most preferred embodiments facilitate the use of command clustering and optimization. Command clustering is where the memory controller 100 gathers disparate write and read commands and combines them together for increased efficiency of memory reads and writes. Command clustering in the write queue 130 is simplified compared to the prior art since all commands in the queue are ready to execute, since there are no RMW commands waiting for data in the write queue 120. Command clustering in the RMW queue 135 is also simplified because it is separate from the queues dealing directly with execution. Clustering on the RMW queue 135 can also be done with less interruption of the execution process since accessing the RMW queue 135 can be done in parallel with execution occurring in the other queues. Clustering and optimization of RMW commands can also be accomplished as described below.

Again referring to FIG. 1, the memory controller 100 can perform optimizations of commands on the RMW queue 135. The memory controller 100 first attempts to combine RMW commands on the RMW queue 135. The memory controller 100 looks for RMW queue entries that are to the same cacheline. The memory controller 100 can combine entries on the RMW queue that are to the same cacheline. This combination can be done before the read or after the read of the data for the RMW commands. If the merged entries accumulate to a full cacheline, then any reads that may have been sent to the read queue can be cancelled. In another optimization, the memory controller 100 looks for RMW queue entries that are to the same cacheline as a write on the write queue 130. Since data on the write queue 130 is to a full cacheline, the memory controller 100 can combines entries on the RMW queue 135 that are to the same cacheline as the writes on the write queue 130 without performing a read of the data.

The timing diagram of FIG. 2 illustrates the timing according to the preferred embodiments. FIG. 2. also readily shows the difference in timing when compared with the prior art timing in FIG. 11. The activity on the memory controller is shown under the heading "Memory Bus Operation" compared with the timing of a "Memory Bus Clock." A first RMW cycle is designated as RMW0. The RMW0 cycle has a read command 210 and a write command 220. The time between the read command 210 and a write command 220 is a RMW time 230. In contrast to the prior art memory controllers, the time 230 between the read portion of the RMW command 210 and the write portion 220 includes other access commands to the memory. In FIG. 2 the read portion of other RMW commands (RMW1, RMW2, and RMW3) are shown to be executed between the read and write of the RMW0 command. Note, however, because the read command portion of a RMW command appears the same as a processor read command on the read queue 120, the read cycles labeled RMW1, RMW2 and RMW3 in FIG. 2 could also represent processor reads as well.

Figure 3:
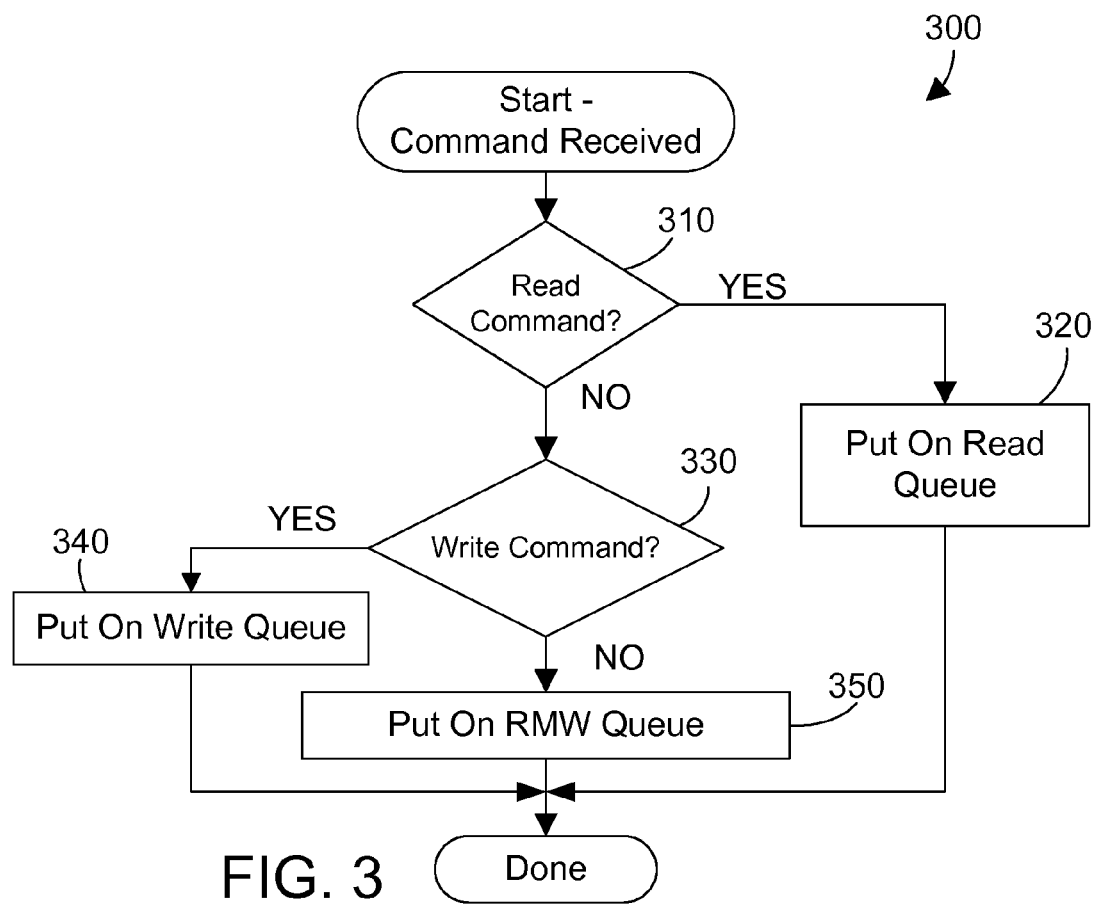
FIG. 3 is a flow diagram of a method for processing RMW operations in accordance with the preferred embodiments.

FIG. 3 illustrates a flow diagram of a method 300 for processing RMW operations in accordance with the preferred embodiments. Method 300 shows the logic of the memory controller 100 to translate the atomic read/modify/write operation into separate read and write operations as described above. Method 300 is the initial part of the logic for processing incoming commands to the memory controller 100. Upon receiving a new command, the controller checks if the command is a read command (step 310). If the command is a read command (step 310=yes) then the command is put on the read queue (step 320). If the command is not a read command (step 310=no) then the controller checks if it is a write command (step 330). If the command is a write command (step 330=yes) then the command is put on the write queue (step 340). If the command is not a write command (step 330=no) then the command must be a RMW command and the controller puts the command on the RMW queue (step 350).

Figure 4:
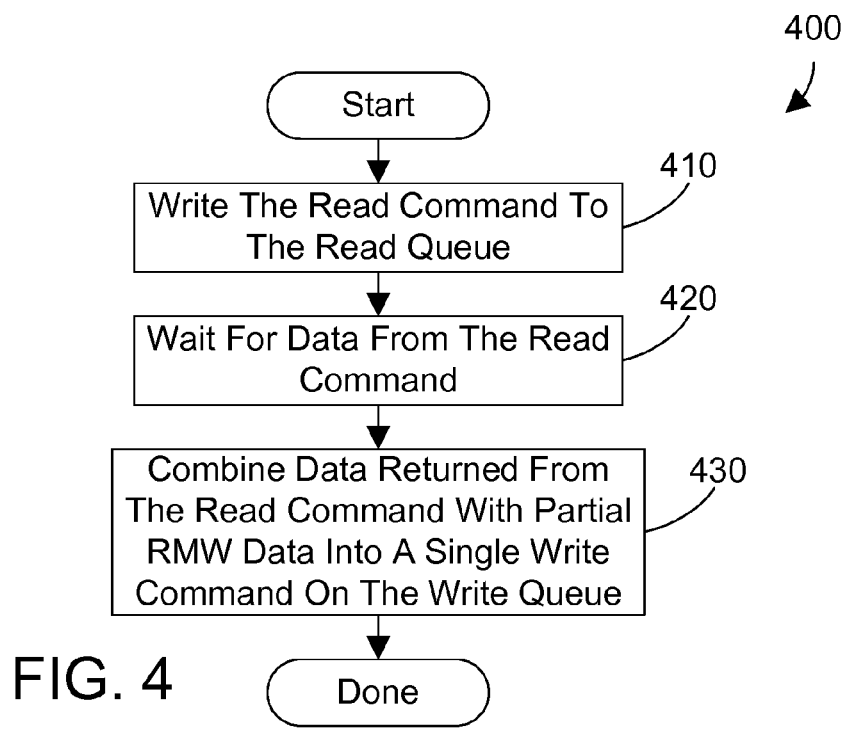
FIG. 4 is a flow diagram of a method for processing RMW operations in accordance with the preferred embodiments.

FIG. 4 illustrates a flow diagram of a method 400 for processing RMW operations in accordance with the preferred embodiments. Method 400 shows the logic of the memory controller 100 to execute a RMW command on the RMW queue to translate the RMW command into separate read and write operations as described above. The controller first writes the read portion of the RMW command in the RMW queue to the read queue (step 410). The controller then waits for data from the read command (step 420) to be returned from the read portion of the RMW command that was placed on the read queue and executed from the read queue. The controller then combines data returned from the read queue with the partial RMW data of the original RMW command into a single write command and places the write command on the write queue (step 430).

Figure 5:
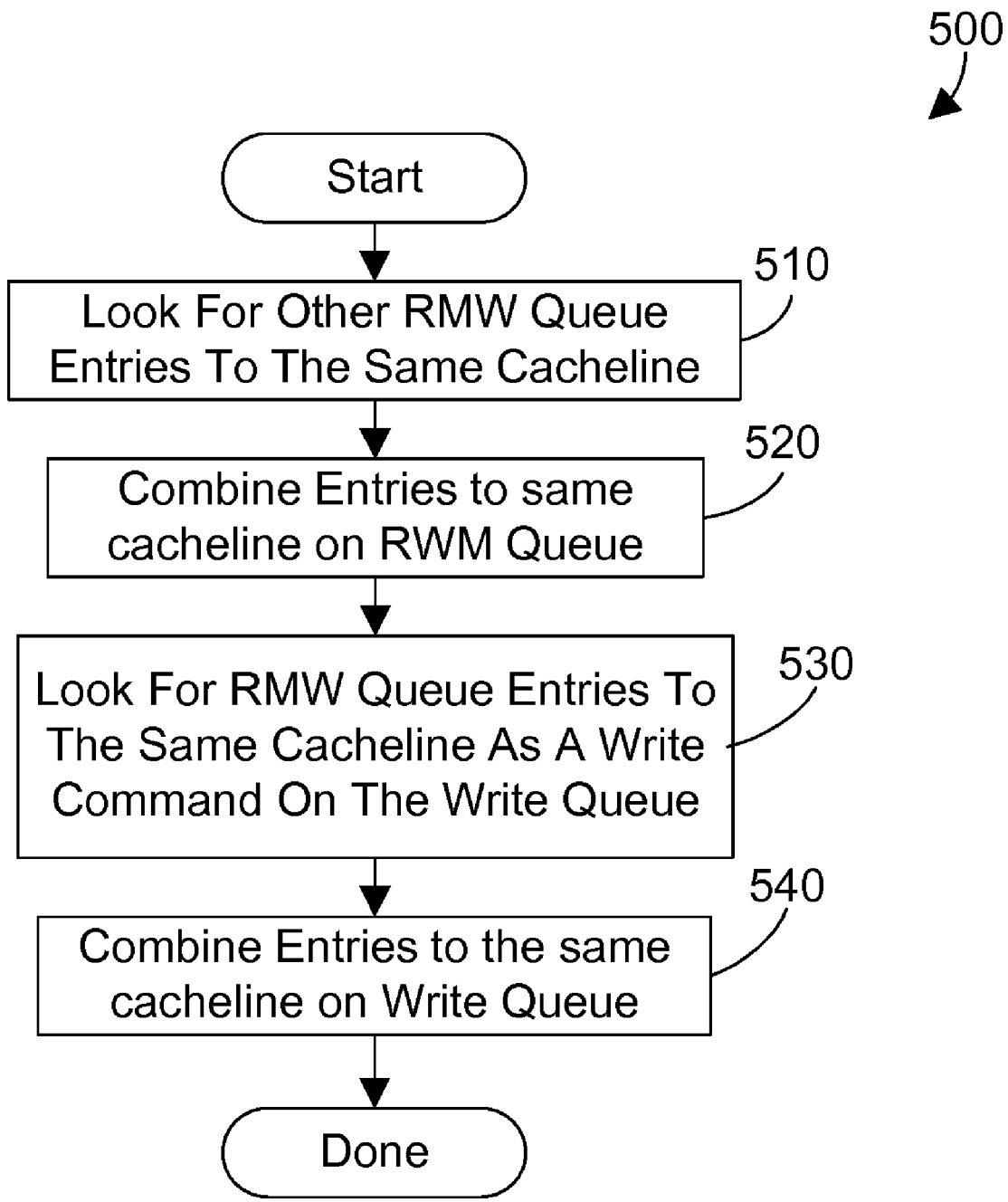
FIG. 5 is a flow diagram of a method for processing RMW operations in accordance with the preferred embodiments.

FIG. 5 illustrates a flow diagram of a method 500 for processing RMW operations in accordance with the preferred embodiments. Method 500 shows the logic of the memory controller 100 to combine RMW commands on the RMW queue. The controller first looks for RMW queue entries that are to the same cacheline (step 510). The controller combines entries to the same cacheline on the RMW queue (step 520). The controller then looks for RMW queue entries that are to the same cacheline as a write on the write queue (step 530). The controller combines the RMW command on the RMW queue and the write command on the write queue into the write command on the write queue (step 540).

Figure 6:
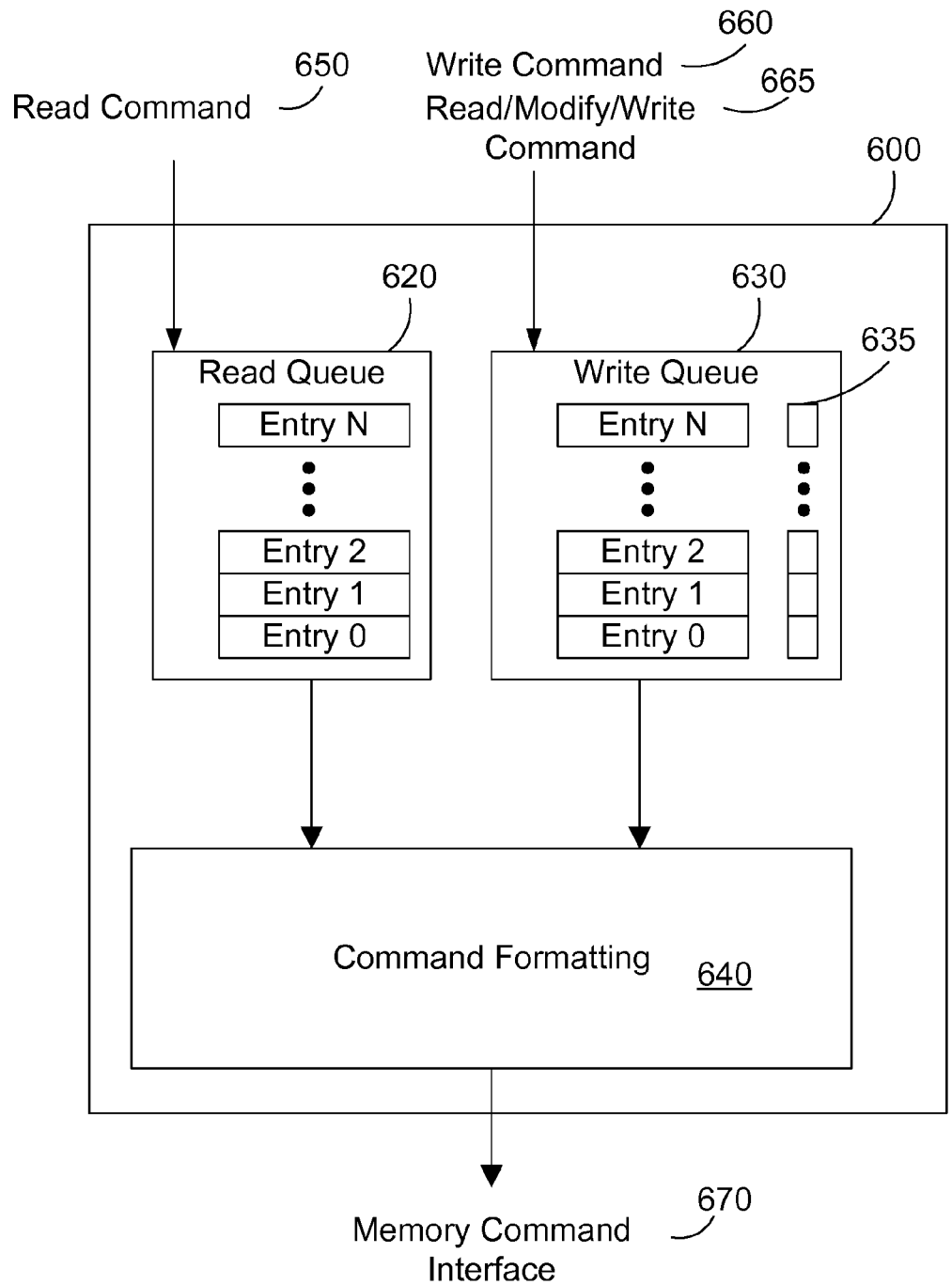
FIG. 6 is another block diagram of a memory controller in accordance with the preferred embodiments.

Referring to FIG. 6, another memory controller 600 in accordance with the preferred embodiments is shown. The features and operation of memory controller 600 are similar to those described above with reference to FIG. 1. However, in this embodiment, the RMW commands are placed in the write queue 630 along with write commands. The memory controller 600 includes a read queue 620, a write queue 630 and command formatting logic 640. A read command 650 from a processor is written to the read queue 620. A write command 660 from the processor is written to the write queue 630. A RMW command 665 from the processor is also written to the write queue 630. The memory controller includes a control register 635 for each entry location in the write queue 630, or at least those entries that are used for RMW commands. The control register 635 may include one or more register bits or flags used by the memory controller 600 for executing the RMW command from the write queue 630. The control register for the described embodiment includes a RMW flag to indicate the command is a RMW, and a dependency flag to indicate the command is waiting for a read command to complete.

Figure 7:
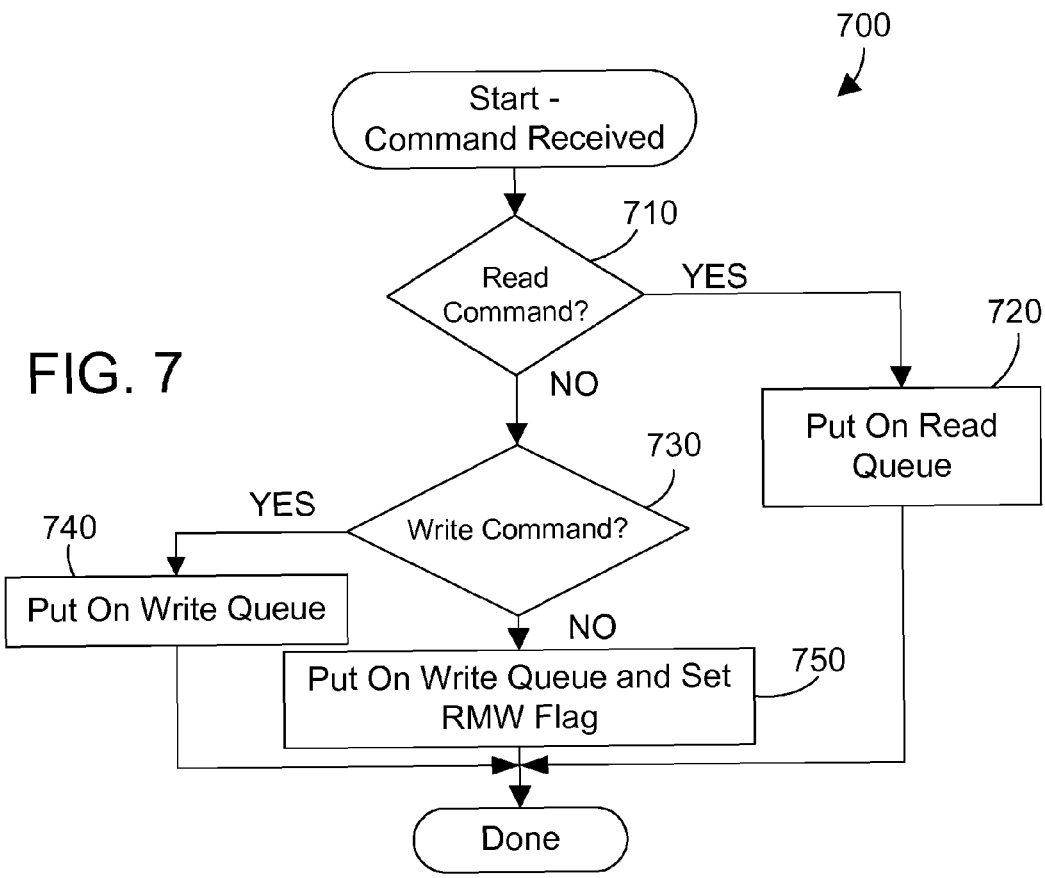
FIG. 7 is a flow diagram of a method for processing RMW operations in accordance with the preferred embodiments for the memory controller in FIG. 6.

FIG. 7 illustrates a flow diagram of a method 700 for processing RMW operations in accordance with the preferred embodiments related to FIG. 6. Method 700 shows the logic of the memory controller 100 to translate the atomic read/modify/write operation into separate read and write operations as described above. Method 700 is the initial part of the logic for processing incoming commands to the memory controller 600. Upon receiving a new command, the controller checks if the command is a read command (step 710). If the command is a read command (step 710=yes) then the command is put on the read queue (step 720). If the command is not a read command (step 710=no) then the controller checks if it is a write command (step 730). If the command is a write command (step 730=yes) then the command is put on the write queue (step 740). If the command is not a write command (step 730=no) then the command must be a RMW command and the controller puts the command on the write queue and sets a RMW flag or a dependency indicator associated with the command in the write queue (step 750).

Figure 8:
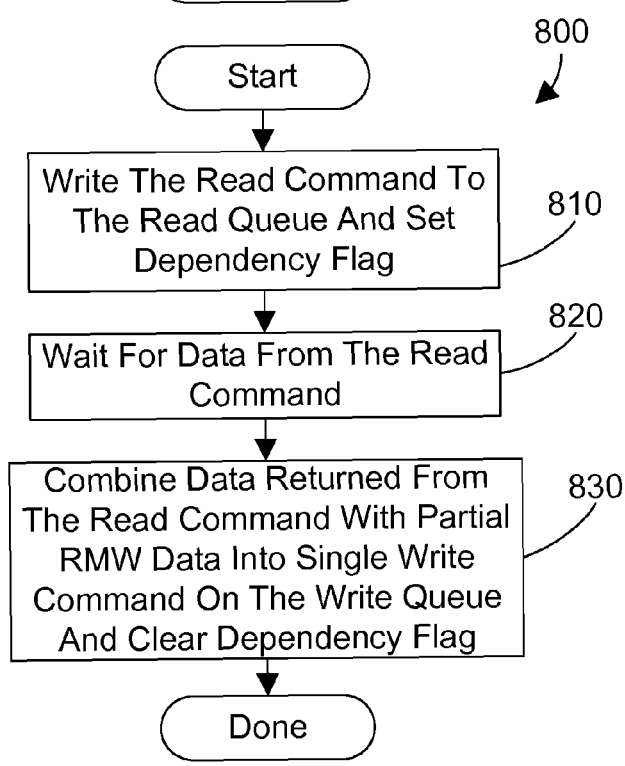
FIG. 8 is a flow diagram of a method for processing RMW operations in accordance with the preferred embodiments for the memory controller in FIG. 6.

FIG. 8 illustrates a flow diagram of a method 800 for processing RMW operations in accordance with the preferred embodiments. Method 800 shows the logic of the memory controller 600 to execute a RMW command on the write queue. The controller first writes the read portion of the RMW command in the RMW queue to the read queue and sets a dependency flag (step 810). The controller then waits for data from the read command (step 820) to be returned from the read portion of the RMW command that was placed on the read queue and executed from the read queue. The controller then combines data returned from the read queue with the partial RMW data of the original RMW command into a single write operation and places the command on the write queue and clears the dependency flag (step 830).

Figure 9:
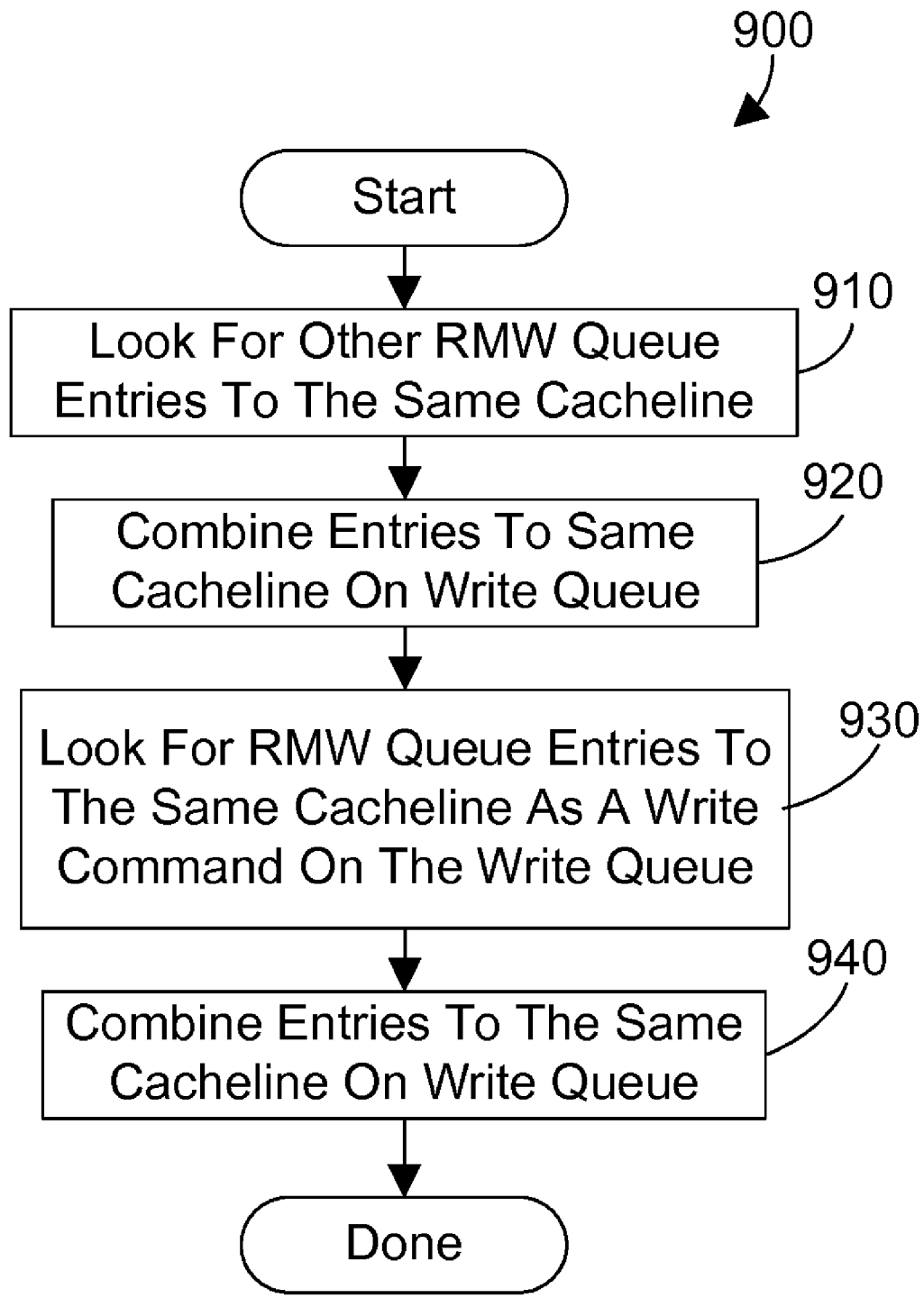
FIG. 9 is a flow diagram of a method for processing RMW operations in accordance with the preferred embodiments for the memory controller in FIG. 6.

FIG. 9 illustrates a flow diagram of a method 900 for processing RMW operations in accordance with the preferred embodiments. Method 900 shows the logic of the memory controller 600 to combine RMW commands on the write queue. The controller first looks for RMW queue entries that are to the same cacheline (step 910). The controller combines entries to the same cacheline on the write queue (step 920). The controller then looks for RMW queue entries that are to the same cacheline as a write command on the write queue (step 930). The controller combines the RMW command on the write queue and the write command on the write queue into the write command on the write queue (step 940).

The embodiments described herein provide important improvements over the prior art. The memory controller optimizes RMW commands by breaking them into separate and unique read and write commands. The embodiments allow the memory controller to translate RMW commands into read and write commands with the proper sequence of execution to preserve data consistency. The preferred embodiments will provide the computer industry with increased memory bandwidth during Read/Modify/Write cycles for an overall increase in computer system performance.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the preferred embodiments are discussed herein with particular regard to DRAMs, the memory controller and methods of the preferred embodiments may be applied to any semiconductor memory including embedded memory systems.

The invention claimed is:

1. A memory controller comprising:
a read queue;
a write queue;
a read/modify/write (RMW. queue to hold a RMW command; and
wherein the memory controller translates the RMW command into a read command on the read queue and a write command on the write queue and controls a sequence of executing the read command and the write command.

2. The memory controller of claim 1 wherein the memory controller removes the RMW command from the RMW queue after receiving results of executing the read command, and writes the write command to the write queue.

3. The memory controller of claim 1 wherein the write queue has a dependency indicator for the RMW command in the write queue.

4. The memory controller of claim 1 wherein a read command on the read queue may be executed after commencing a read portion of a RMW cycle and before completion of the RMW cycle.

5. The memory controller of claim 1 wherein the memory controller controls embedded memory.

6. A memory controller comprising:
a write queue for write operations to a memory coupled to the memory controller;
a read queue for read operations to the memory;
a read-modify-write (RMW. queue for RMW operations to the memory;
in response to a RMW command issued to the memory controller, the memory controller performing the steps of:
writing a read command portion of the RMW command to the read queue;
waiting for data from an executing read command portion of the RMW command;
combining the data from the read command portion of the RMW command with partial data from the RMW command into a single write command; and
writing the single write command to the write queue.

7. The memory controller of claim 6 wherein a read command on the read queue may be executed after commencing a read portion of a read-modify-write cycle and before completion of the read-modify-write cycle.

8. A method for a memory controller to access memory, the method comprising the steps of:
writing a read command to a read queue;
writing a write command to a write queue;
writing a read-modify-write (RMW) command to a RMW queue;
translating the RMW command on the RMW queue into a second read command on the read queue and a second write command on the write queue; and
controlling a sequence of executing the second read command and the second write command.

9. The method of claim 8, further comprising the step of removing the RMW command from the RMW queue after receiving results from executing the second read command and writing the second write command to the write queue.

10. The method of claim 8, further comprising the step of setting a dependency indicator for the RMW command in the write queue.

11. The method of claim 8, wherein a read command on the read queue is executed after commencing a read portion of a read-modify-write cycle and before completion of the read-modify-write cycle.

12. A method for a memory controller to access memory, the method comprising the steps of:
writing a read command to a read queue;
writing a write command to a write queue;
writing a read-modify-write (RMW) command to a RMW queue;
writing a read command portion of the RMW command to the read queue;
waiting for data from an executing read command portion of the RMW command;
combining the data from the read command portion of the RMW command with partial data from the RMW command into a single write command; and
writing the single write command to the write queue.

13. The method of claim 12 wherein a read command on the read queue may be executed after commencing a read portion of a read-modify-write cycle and before completion of the read-modify-write cycle.

* * * * *